United States Patent [19]

Yamakawa et al.

[11] Patent Number: 4,812,656
[45] Date of Patent: Mar. 14, 1989

[54] PROCESSING OF RADIOISOTOPE-DISTRIBUTION IMAGING SIGNALS IN A SCINTILLATION CAMERA APPARATUS

[75] Inventors: Tsutomu Yamakawa; Hirofumi Iwao, both of Tochigi, Japan

[73] Assignee: Kabushiki Kaisha Toshiba, Kawasaki, Japan

[21] Appl. No.: 31,883

[22] Filed: Mar. 30, 1987

[30] Foreign Application Priority Data

Mar. 31, 1986 [JP] Japan .................................. 61-74625
Apr. 9, 1986 [JP] Japan .................................. 61-80038

[51] Int. Cl.[4] .............................................. G01T 1/164
[52] U.S. Cl. .................................. 250/363 R; 250/369
[58] Field of Search .............. 250/363 S, 363 SE, 369, 250/363 SA, 363 SB, 366; 364/414

[56] References Cited

U.S. PATENT DOCUMENTS

| Re. 30,904 | 4/1982 | Miller et al. ..................... 250/363 S |
| 3,394,689 | 10/1976 | Arseneau ........................... 123/637 |
| 3,525,047 | 8/1970 | Schwartz .......................... 250/369 |
| 3,980,886 | 9/1976 | Stout ................................ 250/363 S |
| 4,024,398 | 5/1977 | Hatch ............................... 250/363 S |
| 4,142,102 | 2/1979 | Lange ............................... 250/369 |
| 4,415,982 | 11/1983 | Nishikawa ....................... 250/363 S |
| 4,593,198 | 6/1986 | Pang et al. ....................... 250/363 S |
| 4,661,909 | 4/1987 | Kumazawa et al. ........... 250/363 SR |

FOREIGN PATENT DOCUMENTS

0121701A1 10/1984 European Pat. Off. .

Primary Examiner—Janice A. Howell
Assistant Examiner—William F. Rauchholz
Attorney, Agent, or Firm—Finnegan, Henderson, Farabow, Garrett, & Dunner

[57] ABSTRACT

Gamma rays radiated from a radioisotope injected into a subject under examination are detected by a scintillation camera, and position signals indicative of the detected position of the gamma rays and an energy signal are applied to a data-processing unit for imaging the distribution of the radioisotope within the subject. A pulse height analyzer analyzes an energy discrimination signal and provides an imaging control signal when the pulse height of the energy discrimination signal falls within a window of interest. The data-processing unit is responsive to the application of the imaging control signal to thereby image the distribution of radioisotopes within the subject on the basis of the position signals and the energy signal. The energy discrimination signal may have a pileup waveform in which at least two peaks are produced substantially at the same time due to simultaneous detection of gamma rays. The pulse height analyzer detects the first peak of the pileup waveform, but fails to detect the succeeding peak. This results in an erroneous calculation of the position signals. To prevent this, a counting error-eliminating circuit is provided which prevents the application of the image control signal to the data-processing unit when the energy discrimination signal indicates a pileup waveform.

6 Claims, 9 Drawing Sheets

FIG. 2

FIG. 3A  $Z_{PHA}$

FIG. 3D  INTEGRATED OUTPUT   THRESHOLD LEVEL (>WU1)

FIG. 3E  F/F Q OUTPUT

FIG. 3F  (UNB)

FIG. 3G  UNB

PROCESSING OF RADIOISOTOPE-DISTRIBUTION IMAGING SIGNALS IN A SCINTILLATION CAMERA APPARATUS

BACKGROUND OF THE INVENTION

The present invention relates to a scintillation camera apparatus which is employed in medical diagnosis, and more particularly, to the processing of radioisotope distribution imaging signals in a scintillation camera apparatus.

A scintillation camera apparatus for use in medical diagnosis comprises a scintillation camera (i.e., a gamma camera) and a data-processing device. The camera detects the distribution of a radioisotope (RI) which has been injected to a subject under examination and which is concentrated within a specific organ of the subject. The data-processing device processes data provided by the camera, to image the RI distribution within a region of interest of the subject. The scintillation camera is provided with a collimator, a scintillation crystal, and photomultipliers. It is used as a two-dimensional detector for detecting gamma rays radiated from inside the subject.

In this scintillation camera apparatus, the gamma rays radiated from inside the subject are detected as events of scintillation, by means of the scintillation crystal and photomultipliers. Gamma-ray detection signals are applied to a position-calculating circuit, as well as to an energy signal-generating circuit. The position-calculating circuit produces position signals X and Y representing the position of the generation of gamma rays. The energy signal-generating circuit generates an energy signal Z representing the intensity of detected gamma rays. Position signals X and Y and energy signal Z are used for imaging the RI distribution within the subject. More specifically, the scintillation camera also generates an energy-discriminating signal $Z_{PHA}$. When the magnitude of the $Z_{PHA}$ signal falls within a window (range) of interest, an unblank signal (hereinafter referred to as "UNB signal") is genertated. Position signals X and Y, energy signal Z, and the UNB signal together enable the forming of an RI distribution image. The digitization of signals X, Y, and Z is enabled by the UNB signal. When the UNB signal is generated, the position defined by signals X and Y is imaged as a source of gamma rays. Each time an event of gamma-ray scintillation is detected, a +1 count is accumulated at that memory location of an image acquisition memory which is addressed by position signals X and Y. Hence, the RI distribution can be imaged on a display, based on the event information, stored in the image memory, which represents the generation position, and the intensity of the gamma rays.

Pulse-height analysis (PHA) is used in a scintillation camera apparatus in order to determine whether or not a $Z_{PHA}$ signal falls within a specified window of interest. This analysis is performed within a predetermined sampling period.

Two or more events of scintillation may take place almost simultaneously on the scintillation crystal, irrespective of the scintillation positions. If such is the case, the waveform of the $Z_{PHA}$ signal will have two or more peaks during the sampling period. This type of the $Z_{PHA}$ signal waveform is referred to as a "pileup waveform." When a conventional pulse height analysis technique is employed, a UNB signal is generated in response to only the first peak of the pileup waveform of the $Z_{PHA}$ signal. In other words, another peak, which has been produced at almost the same time as the first peak, cannot be detected or identified. Consequently, the scintillation positions of gamma rays may be calculated incorrectly.

This calculation error can be observed more noticeably at the center portion of the two-dimensional detector, than at the peripheral portions thereof. The higher the count rate, or the more frequently the scintillation events occur, the greater the deterioration in the uniformity profile of the detector. In particular, the uniformity profile is not flat; it is higher at the center than at the peripheral portions.

SUMMARY OF THE INVENTION

It is accordingly an object of the present invention to provide a scintillation camera apparatus which can reduce gamma ray position-detection calculation errors resulting from the simultaneous counting of scintillation events, and which can provide an improved uniformity profile when scintillation events take place at a high count rate.

To achieve this object, according to the present invention, detection means are provided for detecting whether or not a $Z_{PHA}$ signal obtained by a scintillation camera is a pileup waveform, i.e. one having two or more peaks. When the pileup waveform is detected, position signals X and Y and an energy signal Z are not adapted for imaging the RI distribution of the gamma rays, even if the peaks of the $Z_{PHA}$ signal fall within a window of interest.

DETAILED DESCRIPTION OF THE PREFERRED EMBODIMENTS

In order to facilitate the understanding of a scintillation camera apparatus of this invention, a conventional scintillation camera apparatus will be first explained with reference to FIG. 1.

Scintillation camera 1 comprises a collimator, a scintillation crystal, photomultipliers, preamplifiers coupled to the photomultipliers as described, and a weighting circuit for weighting output signals of the preamplifiers. The weighting circuit generates pulse-like coordinate signals $X+$, $X-$, $Y+$ and $Y-$ in accordance with the detected position of gamma rays, and also generates a Zdiv signal and a $Z_{PHA}$ signal, both concerning the energy of the gamma rays. Signals $X+$, $X-$, $Y+$, $Y-$ and Zdiv signal are applied to position signal generator 2. Signal generator 2 processes these input signals and produces position signals X and Y representing the detected position of gamma rays, which are rectangular pulses the heights of which represent the detected position of the gamma rays. The Zdiv signal has a magnitude proportional to the energy of gamma rays incident on scintillation camera, and is used as correction (normalization) data in calculating the detected position of the gamma rays from coordinate signals $X+$, $X-$, $Y+$ and $Y-$. Signals X and Y are given by $$X=(X+ -X-)Z \text{ div.}$$

$$Y=(Y+ -Y-)Z\text{div.}$$

The $Z_{PHA}$ signal is a pulse having a height proportional to the energy of the gamma rays. The $Z_{PHA}$ signal is applied to energy signal generating circuit 3 to generate an energy signal Z.

The $Z_{PHA}$ signal is also applied to pulse height analyzer or window analyzer 4. Analyzer 4 detects whether or not the pulse height of the $Z_{PHA}$ signal falls within a specific window of interest, and produces a binary PHA signal. Binary PHA signal goes high when the $Z_{PHA}$ signal falls within the window. Window levels are set at window analyzer 4. They are: lower level WL1 and upper level WU1 defining a first window W1; lower level WL2 and upper level WU2 defining a second window W2; and lower level WL3 and upper level WU3 defining a third window W3. It should be noted that a plurality of windows are set in analyzer 4. This is because detected radiations may have two or more peaks, dependent on the kind of used radioisotope, e.g. 67Ga. If analyzer 4 has only one window, analyzer 4 could not achieve an accurate pulse height analyzer for any radiation having two or more peaks, and the detected position of the gamma rays could not be correctly calculated. Of course, it suffices to set only one window when the detected radiation has a single peak. Binary signal PHA goes high when the peak of $Z_{PHA}$ signal falls within either one of the windows. FIG. 1A shows the window levels defining first window W1, second window W2 and third window W3, and also the $Z_{PHA}$ signal whose height falls within first window W1. When the detected radiation has only one peak, the widths of windows W2 and W3 may be set to zero.

The output signal $Z_{PHA}$ of window analyzer 4 is applied to buffer processing circuit 5. Circuit 5 temporalily stores PHA signal for a succeeding event of scintillation until the data processing for the preceding event of scintillation is completed. Buffer processing circuit 5 is important particularly when scintillation occurs at intervals shorter than a dead time of the circuitry in use and, therefore, improves the count rate of scintillation events. Circuit 5 generates buffer-processing timing signals BT1 and BT2 and applies them to position signal generator 2 and energy signal generator 3 to perform the above buffer precessing on the position signals X, and Y, and the energy signal Z. Therefore, signal generator 2 can produce correct position signals X and Y, and circuit 3 can produce a correct energy signal Z even if events of scintillation occur at short intervals. Buffer circuit 5 performs the same buffer processing for binary signal PHA and generates a UNB signal (imaging control signal). The input signals of position signal generator 2 and energy signal generator 3 are each delayed by a delay line. As a result, signals X, Y, and Z are generated in synchronism with the UNB signal output from buffer circuit 5. The UNB signal is applied to trigger generator 6, which produces trigger signals TG1 and TG2.

Position signals X and Y are applied to sample-and-hold circuits 7a and 7b, respectively, and energy signal Z is supplied to sample-and-hold (S/H) circuit 7c. S/H circuits 7a, 7b and 7c are enabled by trigger signal TG1 output from trigger generator 6, thereby sampling and holding signals X, Y and Z. Sampled signals X, Y and Z are applied to analog-to-digital (A/D) converters 8a, 8b and 8c, respectively. A/D converters 8a, 8b and 8c are enabled by trigger signal TG2 output from trigger generator 6 to convert signals X, Y and Z to digital signals.

Digital signals X and Y produced by A/D converters 8a and 8b are applied as address signals to image acquisition memory 9. Digital signal Z provided by A/D converter 8c is applied to window analyzer 10. Window analyzer 10 determines whether an event resulting in signal Z should be collected or not. If the event should be collected, a location in image memory 9 addressed by signals X and Y is incremented by one. Image memory 9 is coupled to video conversion circuit 11. Circuit 11 converts counts of events, stored in memory 9, into a TV video signal. The TV video signal is applied to a CRT display 12, which visually indicates the radioisotope distribution within the subject.

From the above it will be understood that signals X, Y and Z, provided by generators 2 and 3 are used for imaging the radioisotope distribution in the subject when the UNB signal is generated. Namely, when the UNB signal is not provided from buffer circuit 5, S/H circuits 7a, 7b and 7c, and A/D converters 8a, 8b and 8c are not enabled, and thus no data can be input to image memory 9. With the conventional scintillation camera apparatus shown in FIG. 1, window analyzer 4 is not designed to correctly analyze the $Z_{PHA}$ signal with a pileup waveform resulting from two or more events of scintillation which have occurred at almost the same time, so the position calculation for events of scintillation may involve errors.

A first embodiment of the present invention will now be described with reference to FIG. 2. In FIG. 2, the same numerals are used to denote the components identical to those shown in FIG. 1.

In this embodiment the window analyzer 4 comprises three window analyzer units 4a, 4b, and 4c adapted for analyzing multi-peak radiations. Lower level WL1 and upper level WU1 defining a first window W1 are set in window analyzer 4a; lower level WL2 and upper level WU2 defining a second window W2 are set in window analyzer 4b; and lower level WL3 and upper level WU3 defining a third window W3 are set in window analyzer 4c. The outputs of these analyzers 4a, 4b and 4c are ORed by OR gate 4d, thereby providing a PHA signal. The PHA signal is applied to buffer processing circuit 5.

According to an imaging signal processing circuit of this invention, a $Z_{PHA}$ signal is applied to integration circuits 23a and 23b through delay line 21 and buffer 22. Delay line 21 provides the same delay time (0.8 μsec) as that provided by the delay lines used for delaying input signals of position signal generator 2 and energy signal generator 3 shown in FIG. 1.

Output signals of integration circuits 23a and 23b are applied to non-inverting inputs of comparators 24a and 24b, respectively. The signal representing level WU1 of the lowest window W1 set in window analyzer 4a is coupled to inverting inputs of comparators 24a and 24b through gain-controlled buffer 25. Buffer 25 may have a gain slightly greater than unity.

The outputs of comparators 24a and 24b are coupled to clock inputs CK of type D flip-flops 26a and 26b, respectively. Q outputs of flip-flops 26a and 26b are coupled to NOR gate 27. The output of buffer circuit 5 and the output of NOR gate 27 are ANDed by AND gate 28, which produces a binary UNB signal.

Buffer circuit 5 provides two integration enable signals IE1 and IE2 and two clear signals CL1 and CL2. Signals IE1 and IE2 are generated in synchronism with buffer timing signals BT1 and BT2 applied to position signal generator 2 and energy signal generator 3, respectively.

Integration enable signal IE1 is applied to integration circuit 23a and also to the data-input D of flip-flop 26a. Clear signal CL1 is applied to clear terminal CL of flip-flop 26a, thus clearing flip-flop 26a after the completion of the integration in integration circuit 23a. Circuit 23a is enabled for the duration of signal IE1 to integrate the $Z_{PHA}$ signal. Comparator 24a compares the output signal of integration circuit 23a with a threshold level slightly higher than upper level WU1. When the output signal of integration circuit 23a exceeds the threshold level, the output of comparator 24a rises to a high level. The high-level output of comparator 24a clocks flip-flop 26a so that its Q output goes high.

Integration enable signal IE2 is applied to integration circuit 23b and also to the data input D of flip-flop 26b. Clear signal CL1 is applied to clear terminal CL of flip-flop 26b. The set of integration circuit 23b, comparator 24b and flip-flop 26b operates in the same manner as the set of integration circuit 23a, comparator 24a and flip-flop 26a.

In the imaging signal-processing circuit described above, the output of NOR gate 27 is usually at the high level. Hence, AND gate 28 is usually enabled, so that an output signal of buffer circuit 5 is used as a UNB signal. When the output signal of either integration circuit 23a or 23b rises above the threshold level, the corresponding flip-flip is clocked. The output of NOR gate 27 then goes low, thereby disabling AND gate 28. Therefore, an output signal of buffer circuit 5 is blocked. That is, a UNB signal is not provided.

With reference to FIGS. 3A to 3G, it will now be explained how the first embodiment (FIG. 2) of the invention prevents an erroneous calculation of the position of gamma rays, which may result from counting simultaneous events of scintillation. Assume that only first window W1 is set in front window analyzer 4a (FIG. 2). Let us also assure that only one set of integration circuit 23a, comparator 24a and flip-flop 26a is provided.

Figure 2:
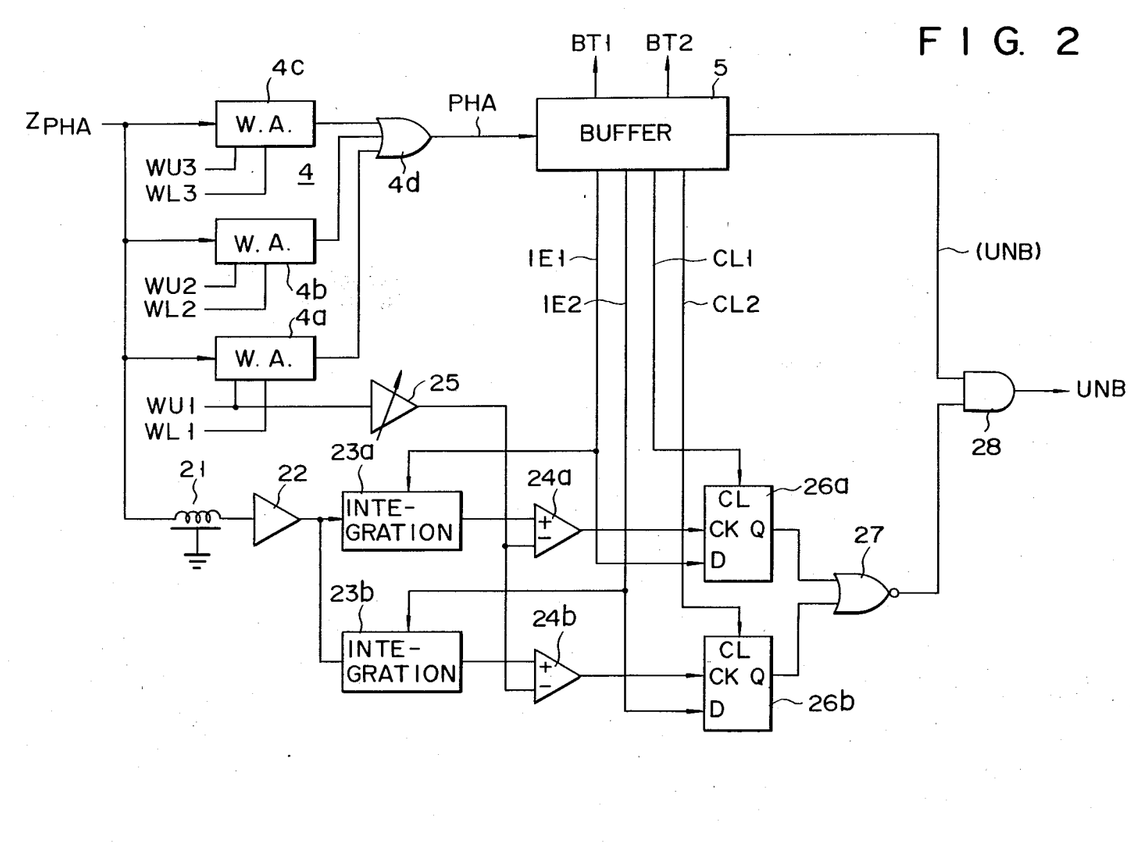
FIG. 2 shows an error count-removing circuit according to an embodiment of the present invention.
Figure 3A:
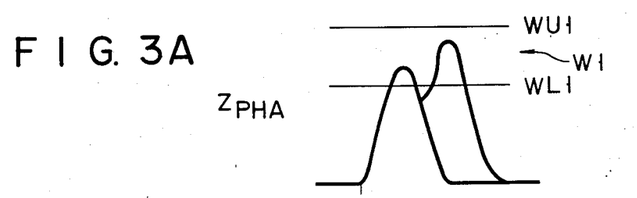
FIGS. 3A to 3G are timing charts explaining the operation of the circuit of FIG. 2.
Figure 3B:
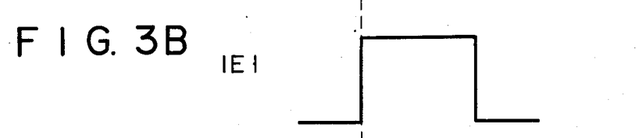
Figure 3C:
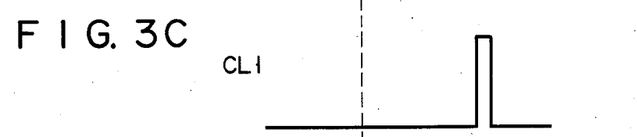

FIG. 3A shows a pileup waveform of a $Z_{PHA}$ signal resulting from two simultaneous events of scintillation and having two peaks both falling within first window W1 set in window analyzer 4a. The pileup waveform is applied to integration circuit 23a through delay line 21 and buffer 22. A binary PHA signal is produced by first window analyzer 4a and applied to buffer circuit 5. In response to the PHA signal, buffer-processing circuit 5 generates integration enable (sampling) signal IE1 (FIG. 3B). It also produces clear signal CL1 (FIG. 3C) in response to the trailing edge of signal IE1. Integration circuit 23 integrates the $Z_{PHA}$ signal during the sampling period determined by signal IE1. It suffices that integration enable signal IE1 has a duration (i.e., the sampling period) about twice that of a usually-obtained $Z_{PHA}$ signal with a single peak.

Figure 3D:
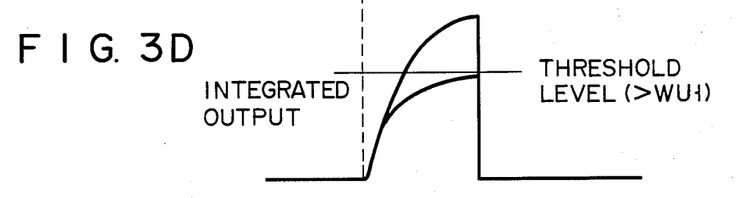
Figure 3E:
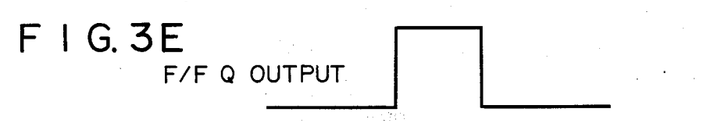
Figure 3F:
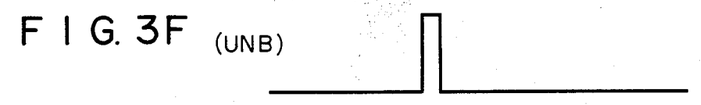
Figure 3G:
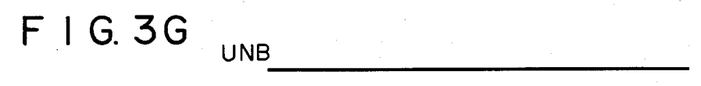

FIG. 3D shows the waveform of an output signal of integration circuit 23a. When the $Z_{PHA}$ signal represents no pileup waveform, the final level of the integrated output signal is lower than the threshold level set in comparator 24a by gain-controlled buffer 25. Hence, the output of comparator 24a remains low, so that flip-flop 26a remains unclocked. Conversely, when the $Z_{PHA}$ signal has a pileup waveform as is shown in FIG. 3A, the final level of the integrated output signal of integration circuit 23a exceeds the threshold level set in comparator 24. In this case, the output of comparator 24a goes high, whereby flip-flop 26a is clocked. As a result, the Q output of flip-flop 26a goes high as is shown in FIG. 3E. The output of NOR gate 27, i.e., the UNB gate signal, goes low, disabling AND gate 28. Therefore, the UNB signal, which buffer circuit 5 has produced in response to the first peak of the $Z_{PHA}$ signal, is not output from AND gate 28 as is shown in FIG. 3G.

Figures 1, 1A:
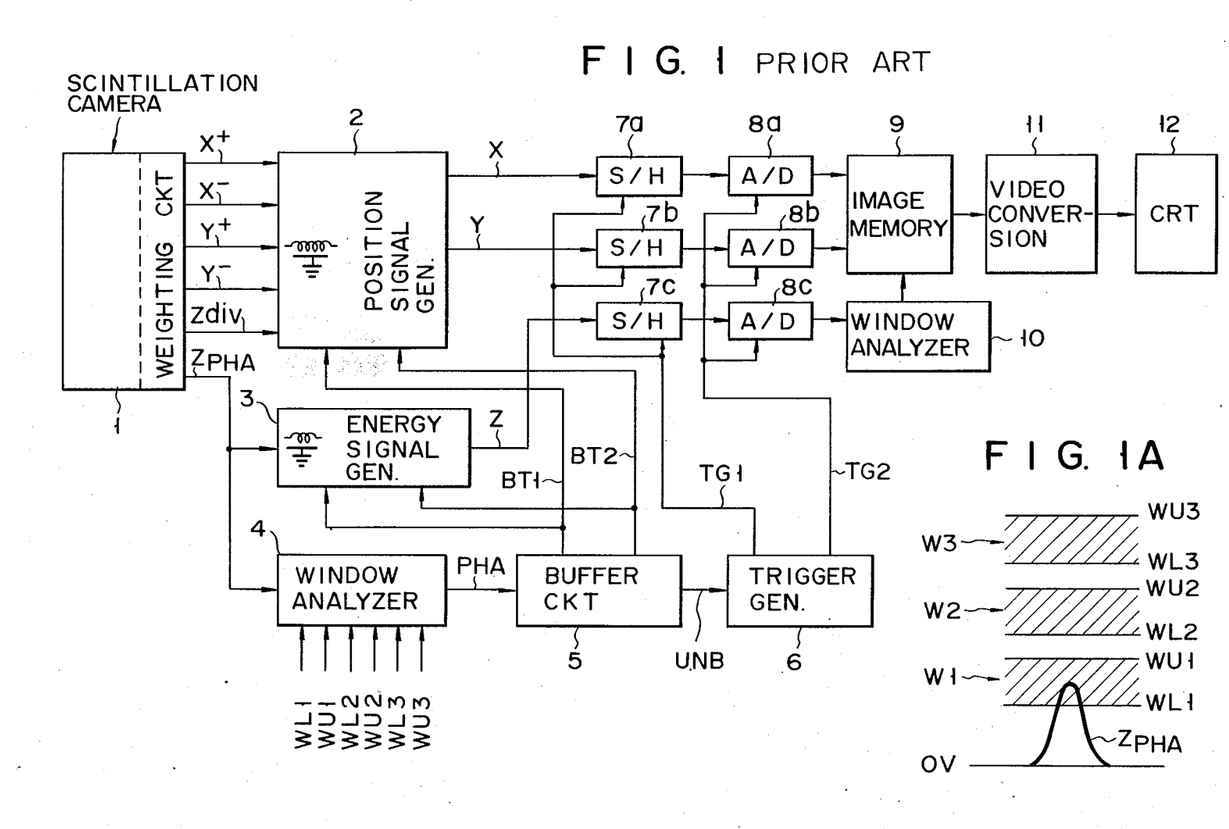
FIG. 1 shows an arrangement of a conventional scintillation camera apparatus.
FIG. 1A explains the relationship between windows set in the pulse height analyzer of FIG. 1 and an energy discrimination signal.

In the conventional scintillation camera apparatus of FIG. 1, the first peak of the energy discrimination signal $Z_{PHA}$ having a pileup waveform is analyzed to produce signals X, Y, Z and UNB, but the next peak of the $Z_{PHA}$ signal cannot be detected. This means that, in spite of the fact that a scintillation event has occurred, the position signals for the scintillation event cannot be utilized for imaging the RI distribution. The conventional scintillation camera apparatus cannot accurately calculate the position where each scintillation has taken place.

With the first embodiment of the present invention, such an inaccurate calculation of the position of scintillation can be prevented due to the fact that the integration value of $Z_{PHA}$ signal differs depending on whether the $Z_{PHA}$ signal has a pileup waveform or not. That is, when the energy discrimination signal has a pileup waveform, the UBN signal is not outputted from AND gate 28, whereby the position signals X and y output by position signal generator 2 and the energy signal Z cannot be used for imaging the RI distribution. This omission of signals X, Y and Z does not affect the imaging of the RI distribution since the simultaneous events of scintillation will uniformly occur on the surface of the two-dimensional detector. In other words, the erroneous position calculation due to the pileup waveform of $Z_{PHA}$ signal is excluded and the RI distribution can be accurately imaged using $Z_{PHA}$ signals with no pileup waveform.

With reference to FIGS. 4A to 4H, it will now be explained how the count rate characteristic can be improved by using two sets of an integration circuit, a comparator and a flip-flop.

Figure 4A:
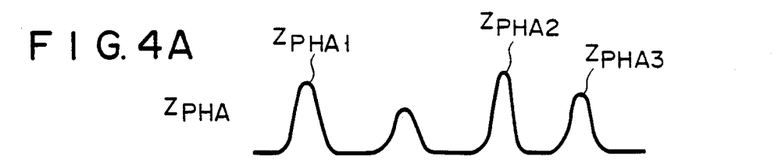
FIGS. 4A to 4H are also timing charts showing the operation of the circuit of FIG. 2.
Figure 4B:
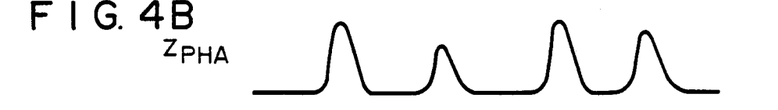

FIG. 4A shows a pulse train of the energy discrimination signal $Z_{PHA}$ supplied from a scintillation camera to window analyzer 4a. Among these pulses, three pulses $Z_{PHA1}$, $Z_{PHA2}$ and $Z_{PHA2}$ have heights falling within the first window W1 set in analyzer 4a. FIG. 4B shows the $Z_{PHA}$ signal obtained from buffer 22 through delay line 21. Assume that the time interval between pulses $Z_{PHA2}$ and $Z_{PHA3}$ is shorter than a dead time of the signal-processing circuitry.

Figure 4C:
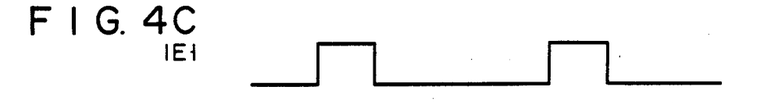
Figure 4D:
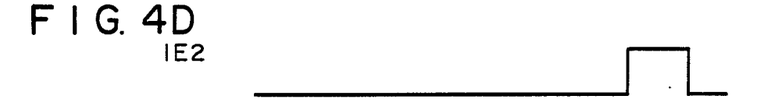
Figure 4E:
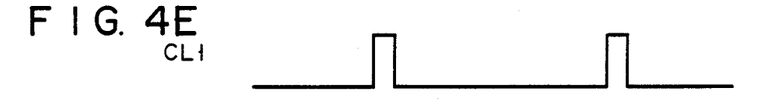
Figure 4F:
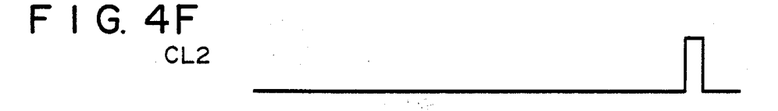

In response to the PHA signal which analyzer 4a has produced upon receipt of the $Z_{PHA}$ signal, buffer circuit 5 generates integration enable pulses IE1 as is shown in FIG. 4C, corresponding to pulses $Z_{PHA1}$ and $Z_{PHA2}$, both shown in FIG. 4B. Circuit 5 also generates clear pulses CL1, as is shown in FIG. FIG. 4E, in response to the trailing edges of the integration enable pulses IE1. Further, buffer circuit 5 produces integration enable pulse IE2, as is shown in FIG. 4D, corresponding to the third pulse $Z_{PHA3}$ of the energy discrimination signal. Circuit 5 also generates clear signal CL2 as is shown in FIG. 4F, in response to the trailing edge of the integration enable signal IE2.

Figure 4G:
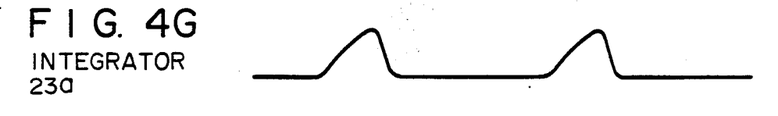
Figure 4H:
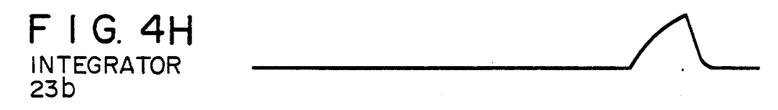

Integration circuit 23a integrates pulses $Z_{PHA1}$ and $Z_{PHA2}$ in response to integration enable signal IE1, thus generating the output signals shown in FIG. 4G. Integration circuit 23b integrates pulse $Z_{PHA3}$ in response to integration enable single IE2, thereby generating the output signal shown in FIG. 4H. With this operation, ZPHA signals coming at an interval shorter than the dead time of the circuitry can be accurately counted. This improves the count rate characteristic of the apparatus. Buffer circuit 5 produces timing signals BT1 and BT2 in synchronism with integration enable signals IE1 and IE2, respectively. It is desirable that the duration (i.e., the sampling period) of signals IE1 and IE2 be about twice that of energy discrimination signal $Z_{PHA}$.

Figure 5:
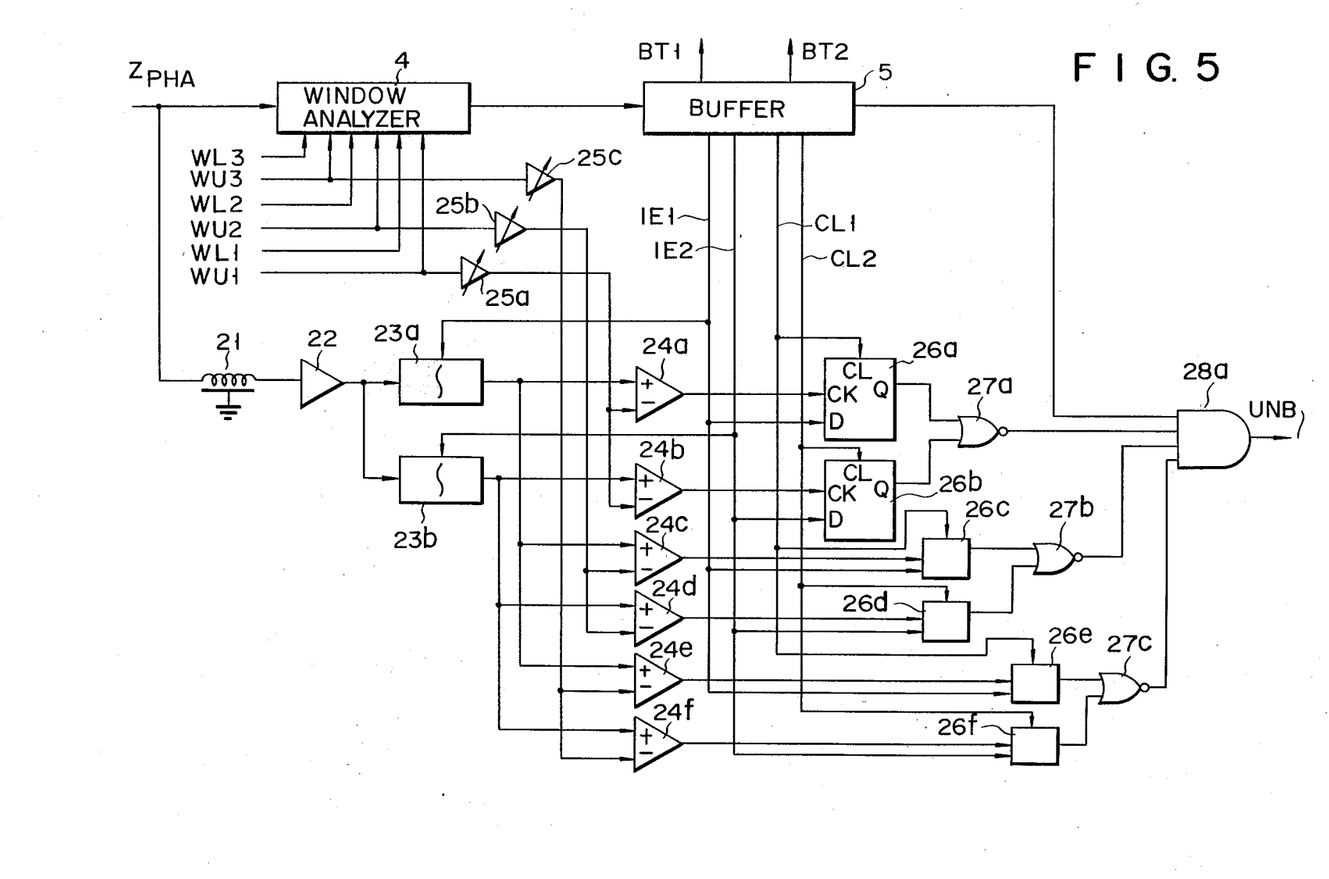
FIG. 5 shows a modification of the circuit shown in FIG. 2.

FIG. 5 shows another processing circuit adapted for gamma rays with multiple peaks. As is shown in FIG. 5, two sets of comparators 24c, 24d; and 24e, 24f with correspond to the set of comparators 24a, 24b are provided. Upper level WU2 is applied as a threshold level to comparators 24c and 24d through gain-controlled buffer 25b. Upper level WU3 is applied as a threshold level to comparators 24e and 24f through gain-controlled buffer 25c.

The outputs of comparators 24c, 24d, 24e and 24f are coupled to the clock terminals CK of flip-flops 26c, 26d, 26e and 26f, respectively. The Q outputs of flip-flops 26a and 26b are coupled to NOR gate 27a. The Q outputs of flip-flops 26c and 26d are coupled to NOR gate 27b. The Q outputs of flip-flops 26e and 26f are coupled to NOR age 27c. The outputs of NOR gates 27a, 27b and 27c are coupled to AND gate 28a together with the output of buffer circuit 5.

The arrangement shown in FIG. 5 can also correctly count events of scintillation even if the $Z_{PHA}$ signal contains a plurality of peaks whose heights fall within any window set in window analyzer 4.

Figure 6:
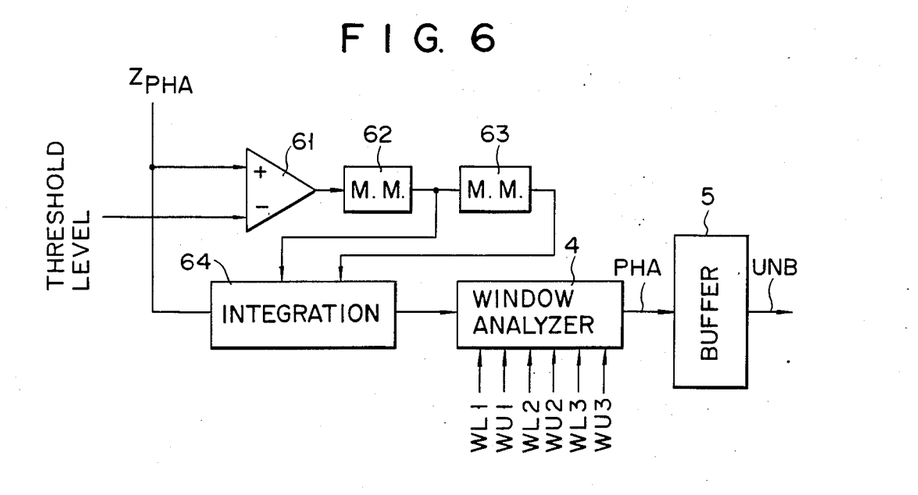
FIG. 6 shows an error count-removing circuit according to another embodiment of the present invention.

Still another embodiment will now be described with reference to FIG. 6. An energy discrimination signal $Z_{PHA}$ is applied to comparator 61, to be compared with with a threshold level. When the $Z_{PHA}$ signal goes above the threshold level, comparator 61 triggers monostable multivibrator 62. Multivibrator 62 produces an integration enable signal, shown in FIG. 7B, which is applied to integration circuit 64. The $Z_{PHA}$ signal is also supplied to integration circuit 64. Circuit 64 integrates the energy discrimination signal $Z_{PHA}$ for the duration of the integration enable signal supplied from multivibrator 62. Monostable multivibrator 63 is triggered at the trailing edge of the integration enable signal output by multivibrator 62, thereby generating a clear signal. The clear signal is applied to integration circuit 64. In response to the clear signal, circuit 64 applies an integration final value to analyzer 4.

Figure 7A:
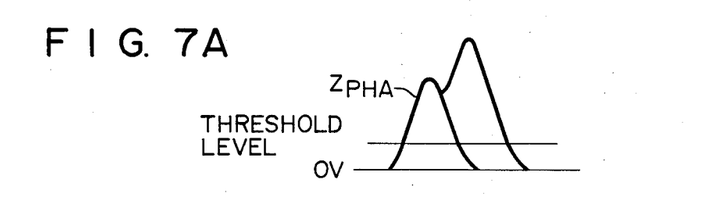
FIGS. 7A to 7C are timing charts illustrating the operation of the circuit shown in FIG. 6.
Figure 7B:
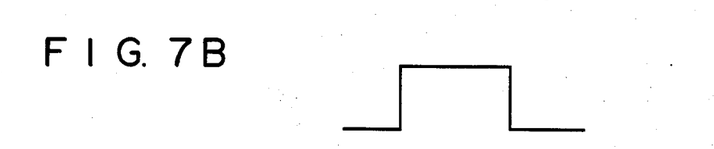
Figure 7C:
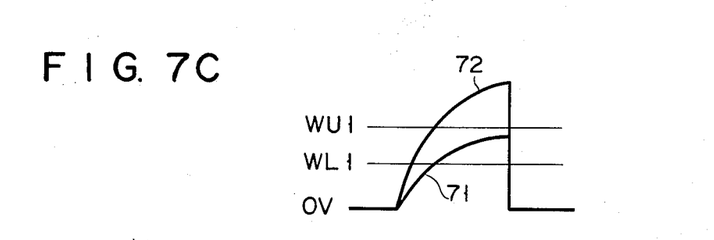

With reference to FIGS. 7A to 7C, the operation of the embodiment of FIG. 6 will now be described.

FIG. 7A shows the pileup waveform of the $Z_{PHA}$ signal applied to comparator 61 and integration circuit 64. When the $Z_{PHA}$ signal exceeds the threshold level, monostable multivibrator 62 generates the integration enable signal shown in FIG. 7B, which causes integration circuit 64 to integrate the $Z_{PHA}$ signal. FIG. 7C shows an integrated output signal of integration circuit 64. An integrated output signal 71 is produced when the $Z_{PHA}$ signal has a single peak as usual. An integrated output signal 72 is generated when the $Z_{PHA}$ signal has a pileup waveform as shown in FIG. 7A. The final value of integrated output signal is applied to window analyzer 4, which determines the height of the integrated output signal. When the integrated output signal input to window analyzer 4 has a height falling within window W1, as does signal 71 does, analyzer 4 produces a PHA signal, and buffer circuit 5 generates a UNB signal. On the other hand, when the integrated output signal has a height falling outside window W1, as does signal 72, window analyzer 4 provides no PHA signal, and buffer circuit 5 generates no UNB signal. Therefore, the embodiment shown in FIG. 6 can also correctly count events of scintillation even if the $Z_{PHA}$ signal contains a pileup waveform.

Figure 8:
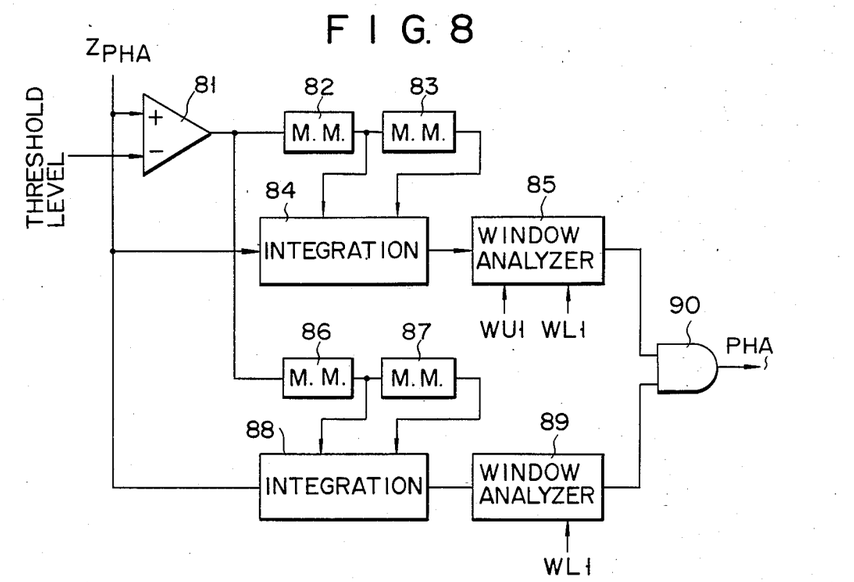
FIG. 8 shows still another embodiment of the error count-removing circuit of the present invention.

A further embodiment of the invention will now be described with reference to FIG. 8. This embodiment is designed to prevent errors in counting events of scintillation due to a pileup waveform of an energy discrimination signal having at least two low peaks.

An energy discrimination signal $Z_{PHA}$ is applied to comparator 81 to be compared with a specific threshold level. When the $Z_{PHA}$ signal exceeds the threshold level, comparator 81 triggers monostable multivibrator 82, which generates an integration enable signal for enabling integration circuit 84. Monostable multivibrator 83 generates a clear pulse at the trailing edge of the integration enable signal produced by multivibrator 82. THe $Z_{PHA}$ signal is also applied to integration circuit 84, which integrates the $Z_{PHA}$ signal for the duration of the integration enable signal. The clear pulse is supplied from multivibrator 83 to integration circuit 48. In response to the clear pulse, circuit 84 supplies the integration final value to window analyzer 85, which determines whether or not the integration final value falls within a specific window W1. When the integration final value falls within window W1, the output of analyzer 85 goes high. The duration of the integration enable signal output by multivibrator 82 is preferably about twice the time interval in which two peaks of pileup waveform of the $Z_{PHA}$ signal are produced, that is, about twice the duration of an oridinary $Z_{PHA}$ signal.

The output of comparator 81 is also coupled to monostable multivibrator 86. When the $Z_{PHA}$ signal exceeds the threshold level, comparator 81 triggers multivibrator 86. Multivibrator 86 generates an integration enable signal, which is supplied to integration circuit 88. Monostable multivibrator 87 generates a clear pulse at the trailing edge of the integration enable signal produced by multivibrator 86. Integration circuit 88 integrates the $Z_{PHA}$ signal for the duration of the integration enable signal, and applies an integration final value to window analyzer 89 in response to the clear pulse. The lower level WL1 of window W1 is set in analyzer 89. It is desired that the duration of the integration enable signal provided by multivibrator 86 be about the pulse width of an ordinary $Z_{PHA}$ signal having one peak.

The outputs of window analyzers 85 and 89 are coupled to AND gate, 90, which produces a PHA signal when the outputs of window analyzers are high.

Figure 9A:
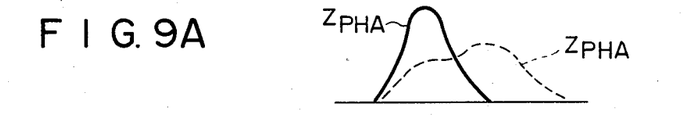
FIGS. 9A to 9E are timing charts explaining the operation of the circuit shown in FIG. 8.
Figure 9B:
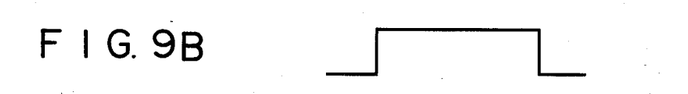
Figure 9C:
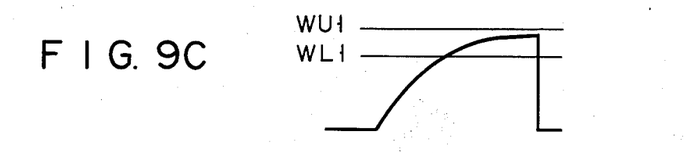
Figure 9D:
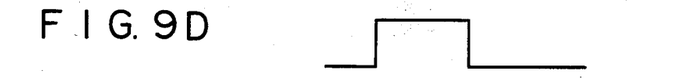

With reference to FIGS. 9A to 9E, the operation of the embodiment of FIG. 8 will now be described. The solid line in FIG. 9A represents an ordinary $Z_{PHA}$ signal having a single peak. The broken line in FIG. 9A shows a $Z_{PHA}$ signal having a pileup waveform with two low peaks. FIG. 9B represents the integration enable signal supplied from monostable multivibrator 82 to window analyzer 84. In response to integration enable signal supplied from multivibrator 82, integrator 84 integrates the $Z_{PHA}$ signal as is shown in FIG. 9C. Since the duration of integration is relatively long, the integration final values obtained from the $Z_{PHA}$ signals indicated by solid and broken lines in FIG. 9A, fall within window W1 set in analyzer 85.

Figure 9E:
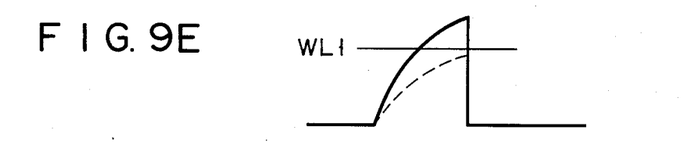

FIG. 9E represents the integration output of integration circuit 88. The duration of the integration of circuit 88 is short. Hence, the integration signal obtained from the ordinary $Z_{PHA}$ signal having a single peak can exceed lower window level WL1 set in window analyzer 89, as is indicated by the solid line, but the integration signal obtained from the $Z_{PHA}$ signal having a pileup waveform with low peaks cannot exceed lower window level WL1, as is indicated by the broken line. The output of window analyzer 85 goes high, and the output of window analyzer 88 remains low, when the $Z_{PHA}$ signal has the pileup waveform represented by the broken line in FIG. 9A. In this case, AND gate 90 produces no PHA signal.

Figure 10:
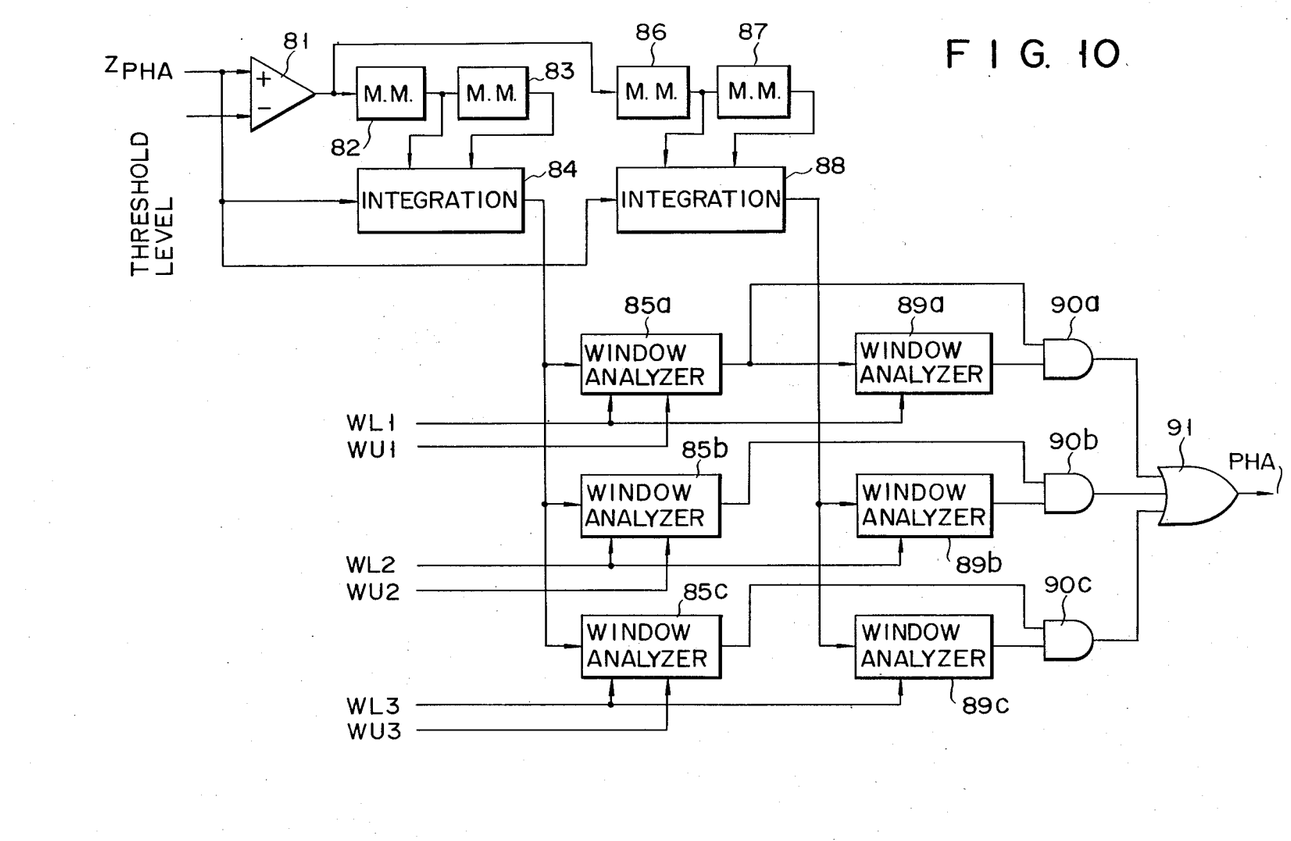
FIG. 10 shows a modification of the circuit shown in FIG. 8.

Still another embodiment of the invention will now be described with reference to FIG. 10. This embodiment involves the teachings of the embodiment of FIG. 8 to prevent errors in counting the events of scintillation which may result from a multi-peak energy discrimination signal. In FIG. 10, like numerals are used to designate like components in FIG. 8.

A $Z_{PHA}$ signal is applied to integration circuit 84, which integrates this signal for a period about twice as long as the duration of the $Z_{PHA}$ pulse. The output of this integration circuit 84 is coupled to window analyzers 85a, 85b and 85c. As in the embodiment of FIG. 2, windows W1, W2 and W3 are set in window analyzers 85a, 85b and 85c, respectively. The output of integration circuit 88, which integrates the $Z_{PHA}$ signal for a period nearly equal to the duration of the $Z_{PHA}$ pulse, is coupled to window analyzers 89a, 89b and 89c. The lower level WL1 of window W1, the lower level WL2 of window W2, and the lower level WL3 of window W3 are set in window analyzers 89a, 89b and 89c, respectively. The output of each of these analyzers 89a, 89b and 89c goes high when the integration final value supplied from circuit 88 exceeds the lower window level. The outputs of corresponding window analyzers 85a and 89a are coupled to AND gate 90a. The outputs of corresponding window analyzers 85b and 89b are coupled to AND gate 90b. The outputs of corresponding window analyzers 85c and 89c are coupled to AND gate 90c. The outputs of AND gates 90a, 90b and 90c are coupled to OR gate 91, which supplies a PHA signal to the buffer circuit.

Figure 11A:
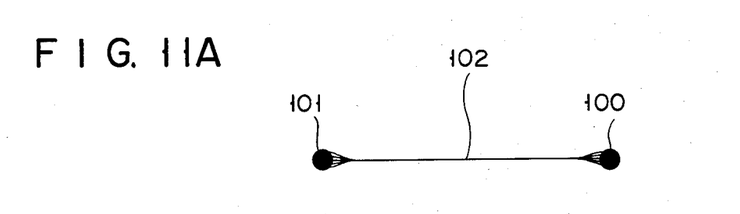
FIGS. 11A and 11B show a scintillation image formed by the conventional apparatus, and an scintillation image formed by the apparatus of this invention, respectively.
Figure 11B:
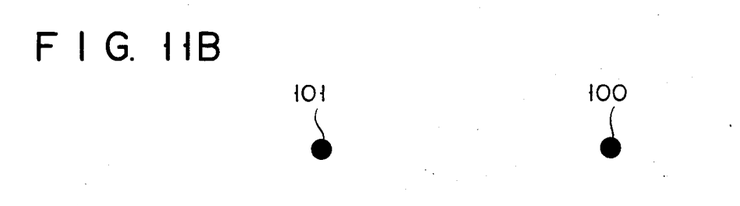

With reference to FIG. 11A and FIG. 11B, the advantage of the present invention will now be described. FIG. 11A shows a scintillation image, resulting from two point sources 100 and 101 contained in pots made of lead, obtained by the conventional scintillation camera apparatus. Due to the error in counting the events of scintillation, a false image such as a line 102 appears between images 100 and 101 of the sources. FIG. 11B shows the like scintillation image for the two point sources, obtained by the scintillation camera apparatus according to the present invention. Due to reduction of errors in counting the events of scintillation, no image of a line between the images of sources 100 and 101 is formed.

Figure 12A:
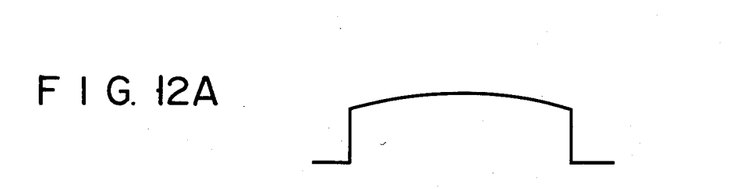
FIGS. 12A an 12B show a uniformity profile of the conventional apparatus, and that of the apparatus according to the present invention, respectively.
Figure 12B:
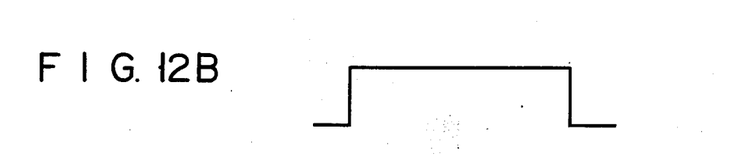

FIG. 12A shows the uniformity profile of the conventional scintillation camera apparatus, and FIG. 12B represents the uniformity profile of the scintillation camera apparatus of the present invention. Referring to the uniformity profile shown in FIG. 12A, it can be seen that the central portion is raised. This is due to more frequent counting of events of scintillation at the central portion than at the peripheral portion. In contrast, the uniformity profile shown in FIG. 12B is substantially flat.

What is claimed is:
1. A scintillation camera apparatus for obtaining an image of a subject into which radioisotopes have been injected, said apparatus comprising:
 a scintillation camera for detecting gamma rays radiated from the radioisotopes, said scintillation camera outputting an X-coordinate signal, a Y-coordinate signal, and an energy signal, the X-ccordinate signal and the Y-coordinate signal being indicative of the position of the radioisotopes and the energy signal including a plurality of pulses having a pulse height proportional to the energy of the detected gamma rays;
 position calculating means connected to said scintillation camera for converting the X-coordinate signal and the Y-coordinate signal into positional imaging data;
 energy imaging signal generating means connected to said scintillation camera for converting the energy signal into an energy imaging signal having a pulse height representative of the energy of the detected gamma rays;
 pulse height analyzing means connected to said energy image signal generating means and responsive to the energy imaging signal for producing an imaging control signal when the pulse height of the energy imaging signal falls within a first window defined by predetermined upper and lower levels;
 imaging means connected to said position calculating means, to said energy imaging signal generating means, and to said pulse height analzying means for producing an image of the subject in accordance with the positional imaging data, the energy imaging signal, and the imaging control signal ; and
 count error eliminating means connected to said scintillation camera and to said imaging means for selectively interrupting the production of the image in response to the energy signal, said count error eliminating means including integrating means connected to said scintillation camera for selectively integrating the energy signal and com- paring means connected to said integrating means and to said imaging means for comparing the integrated energy signal with a second window defined by predetermined upper and lower levels.

2. The apparatus according to claim 1, wherein:

said scintillation camera outputs the energy signal to include a pileup waveform having two peaks appearing substantially simultaneously and lasting for a time interval; and said integrating means integrates the energy signal for at least a period substantially equal to said time interval.

3. The apparatus according to claim 1, wherein:

said integrating means includes a first integration circuit connected to said scintillation camera and to said comparing means and responsive to said comparing means for integrating the energy signal for a first predetermined period to produce a first integrated output signal, and a second integration circuit connected to said scintillation camera and to said comparing means and responsive to said comparing means for integrating the energy signal for a second predetermined period to produce a second integrated output signal;

said pulse height analzying means includes a first pulse height analyzing circuit connected to said first integration circuit for producing a first imaging control signal when said first integrated output signal falls within the second window and a second pulse height analyzing circuit connected to said second integration circuit for producing a second imaging control signal when said second integrated output signal exceeds a level substantially equal to the lower level of the second window; and gate means connected to said first and said second pulse height analyzing circuits and to said imaging means for communicating the imaging control signal to said imaging means when said first and said second pulse height analyzing circuits simultaneously produce the respective first and second imaging control signals.

4. The apparatus according to claim 3, wherein:

said scintillation camera outputs the energy signal to include a pileup waveform having two peaks appearing substantially simultaneously and lasting for a time interval;

said first integration circuit integrates the energy signal for a period substantially equal to the time interval; and said second integration circuit integrates the energy signal for a period shorter than the time interval.

5. The apparatus according to claim 1, wherein:

said integrating means includes a first integration circuit connected to said scintillation camera and to said comparing means and responsive to said comparing means for integrating the energy signal for a first predetermined period to produce a first integrated output signal, and a second integration circuit connected to said scintillator camera and to said comparing means and responsive to said comparing means for integrating the energy signal for a second predetermined period to produce a second integrated output signal; and said pulse height analyzing means includes a plurality of sets of first and second pulse height analyzing circuits, each of said first pulse height analyzing circuits being connected to said first integration circuit and having a unique range defined by an upper and lower bound and corresponding to the second window, each of said first pulse height analyzing circuits producing a first imaging control signal when the first integrated output signal falls within the respective range, and each of said second pulse height analyzing circuits being connected to said second integration circuit and producing a second imaging control signal when the second integrated output signal exceeds the lower level of a corresponding one of the ranges; and gate means connected to each of said plurality of pulse height analyzing circuit sets and to said imaging means for communicating the imaging control signal to said imaging means when each of said first and second pulse height analyzing circuits simultaneously produces the first and second imaging control signals.

6. The apparatus according to claim 5, wherein:

said scintillation camera outputs the energy signal to include a pileup waveform having two peaks appearing substantially simultaneously and lasting for a time interval;

each of said first integration circuits integrates the energy signal for the time interval and each of said second integration circuits integrates the energy signal for a period shorter than the time interval.

* * * * *

UNITED STATES PATENT AND TRADEMARK OFFICE
CERTIFICATE OF CORRECTION

PATENT NO. : 4,812,656
DATED : March 14, 1989
INVENTOR(S) : Tsutomu Yamakawa et al.

It is certified that error appears in the above-identified patent and that said Letters Patent is hereby corrected as shown below:

Claim 1, column 10, line 35, change "ccordinate" to --coordinate--.

Signed and Sealed this

Seventh Day of August, 1990

Attest:

HARRY F. MANBECK, JR.

*Attesting Officer*  *Commissioner of Patents and Trademarks*